(12) United States Patent
Feather, Jr. et al.

(10) Patent No.: US 7,349,997 B2
(45) Date of Patent: *Mar. 25, 2008

(54) DYNAMIC COMMAND FILTER

(75) Inventors: Stanley Smith Feather, Jr., Longmont, CO (US); Jeffery DiCorpo, San Carlos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1054 days.

This patent is subject to a terminal disclaimer.

(21) Appl. No.: 10/346,002

(22) Filed: Jan. 15, 2003

(65) Prior Publication Data

US 2004/0139134 A1   Jul. 15, 2004

(51) Int. Cl.
*G06F 13/14* (2006.01)

(52) U.S. Cl. .............................. 710/18; 710/15; 710/19; 710/5; 710/6

(58) Field of Classification Search ........ 709/213–215, 709/223–225, 235, 238–242; 710/5, 6, 15–19; 718/102, 105

See application file for complete search history.

(56) References Cited

U.S. PATENT DOCUMENTS

| | | | |
|---|---|---|---|
| 6,175,869 B1* | 1/2001 | Ahuja et al. | 709/226 |
| 6,438,652 B1* | 8/2002 | Jordan et al. | 711/120 |
| 6,728,748 B1* | 4/2004 | Mangipudi et al. | 718/105 |
| 2003/0088672 A1* | 5/2003 | Togasaki | 709/226 |

* cited by examiner

*Primary Examiner*—Ilwoo Park

(57) ABSTRACT

A filter comprises a first device, a second device, a dynamic filter, and a device monitor. The dynamic filter is coupled to the first device and the second device, and selectively directs commands to the first device and to the second device based on dynamic status of the first device. The device monitor is coupled to the dynamic filter and to the first device and capable of determining the first device dynamic status.

22 Claims, 5 Drawing Sheets

DYNAMIC COMMAND FILTER

RELATED APPLICATIONS

The disclosed system and operating method are related to subject matter disclosed in the following patent applications that are incorporated by reference herein in their entirety: (1) U.S. Pat. No. 6,816,917, entitled "Storage System with LUN Virtualization", and (2) U.S. Pat. No. 6,823,401, entitled "Monitor for Obtaining Device State by Intelligent Sampling."

BACKGROUND OF THE INVENTION

Filtering of data or other information is a technique for taking some action based on content of the data or information. For example, data filtering can be used to select some data from a data set and acting upon only those records that meet specified criteria. Filtering permits acting upon data without affecting the data. The criterion is typically a "filter property" that can be set at initialization, by programming, or via user interaction.

Data filtering can be used in innumerable applications such as selection of items in a database, collection of information on a desired topic from a network or rejection of unwanted information from the network, and the like. In some applications, filtering can be performed on command information to determine and select from among multiple responses to the command.

A filtering operation typically is an action that involves two component steps; data matching and switching based on the matching result. One or more input fields in a command or data string are matched against a predetermined set of values, and the command or data can be switched to one of multiple targets based on the comparison result.

Information filtering implementations are generally static with matching operations examining received data, comparing the data to a set of static values. For example, a filter may direct all commands of a certain type to a particular target. In another example, a filter may direct all commands from a particular source to a different target. In some applications, the filter can be disabled and enabled during operations, while data is received in real-time, but when enabled have static behavior.

Data filtering can be based on more than one criterion. Typically, multiple-criteria filtering can be implemented as multiple-cascaded discrete filters or as a combinational logic with multiple comparison elements or gates. An example of command filtering based on multiple criteria is filtering based on source identifier (ID) and command type.

A command filter that aggregates multiple criteria can have performance difficulties if a criterion involves the state of a physical device. Physical devices frequently change state, and device interrogation to determine state can be a slow process. Performance problems can result if filtering is delayed while device state is updated for usage in a matching operation.

In a filtering operation that uses cascaded filter steps, component filtering operations are performed sequentially rather than in parallel. Performance can be impacted if a filtering operation depends on device state and the device state changes between filtering steps. The sequential filtering steps add complexity and reduce maintainability of system logic. Cascading does not solve performance difficulties that result from inconsistencies in device state.

SUMMARY OF THE INVENTION

In accordance with the illustrative device, a filter comprises a first device, a second device, a dynamic filter, and a device monitor. The dynamic filter is coupled to the first device and the second device, and selectively directs commands to the first device and to the second device based on dynamic status of the first device. The device monitor is coupled to the dynamic filter and to the first device and capable of determining the first device dynamic status.

In accordance with another embodiment, a method of filtering commands comprises receiving a command directed to a first device, dynamically determining state of the first device, and selectively directing the command to the first device or to a second device based on the determined first device state

BRIEF DESCRIPTION OF THE DRAWINGS

Embodiments of the invention relating to both structure and method of operation, may best be understood by referring to the following description and accompanying drawings.

DETAILED DESCRIPTION

Static filtering can produce errors in some applications due to the dynamic character of systems. A filtering method is desired that improves filtering utility beyond what is possible with static filtering. What is further desired is a method that improves filtering utility in advanced and complex filtering applications. For example, high availability applications can benefit from certain determination of target device state prior to directing data to the device. Embodiments of adaptive, dynamic filters can precisely determine device state and/or appropriately handle information when the device state cannot be precisely determined. The illustrative adaptive filter can filter data based on physical device state in combination with static information.

Improved storage systems include embodiments of dynamic command filters that can filter commands based on physical device state. Such command filters can redirect commands intended for operation on a physical device to another target based on the current state of the physical device, enabling the command filters to direct commands to one of multiple targets. Dynamic state filtering based on physical device state can flexibly respond to device workload and traffic, in contrast to filtering techniques based on static data, such as world wide number (WWN), source ID, or command type. The command filter samples information from multiple sources to determine the current state of the physical device, and passes through or redirects commands based at least partly on the determined state.

Figure 1:
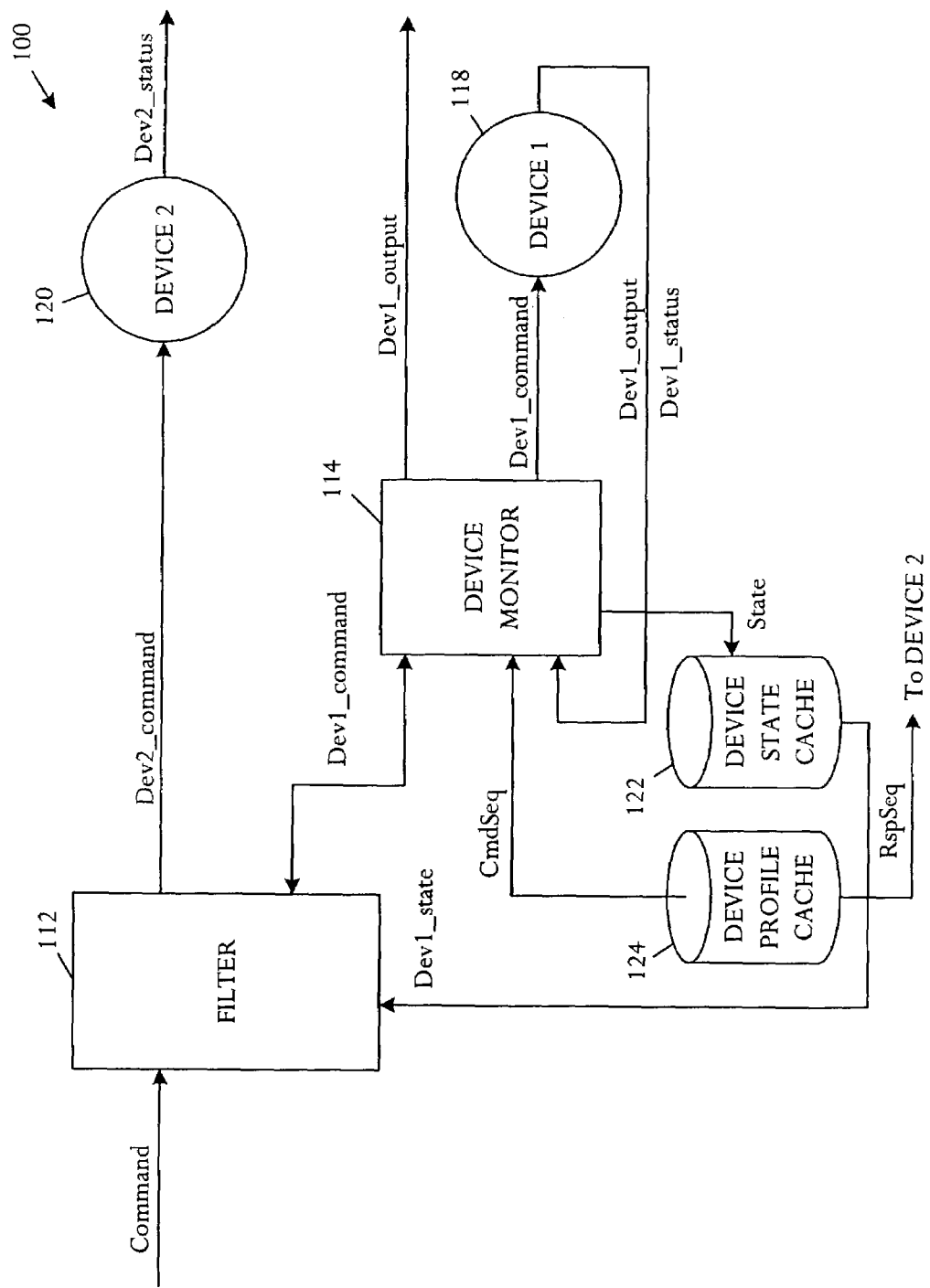
FIG. 1 is a schematic block diagram that shows an embodiment of a dynamic filter.

Referring to FIG. 1, a schematic block diagram shows an example of a dynamic filter 100 that can flexibly filter commands in a dynamic environment by including feedback of device state information into a filter decision. The dynamic filter 100 reduces overall system design complexity and avoids performance degradation that occurs in systems that simply aggregate filter input signals or cascade filter steps. The dynamic filter 100 comprises a filter 112 and a device monitor 114. The illustrative dynamic filter 100 interacts with a first device 118 and a second device 120, although in other embodiments the dynamic filter 100 can also interact with additional devices.

Devices, for example first device 118 and second device 120, can be physical devices or emulated devices. In a storage system, such devices can be tape drives, disk drives, compact disk read-only-memory (CD-ROM) drives, other types of storage devices, or combinations of devices. An emulated device can emulate device operations and respond to commands or task management directives.

The filter 112 manages task handling, and directs commands and task management directives among multiple devices. If a device is bound to an entity, such as a host, server, or initiator that attempts to access a device, commands from the binding entity are passed through to the bound device while commands from other entities are deflected. In various conditions, the commands are passed to a different device or rejected based on the command and other circumstances.

The device monitor 114 issues commands to and captures status and some data from a device. The device monitor 114 ensures integrity of a device state cache 122 by intercepting sense and log data from incoming commands and generating sense and log commands, if appropriate, to refresh the device state cache 122. The device state cache 122 can be a volatile memory or storage that stores information for making a real-time determination of whether a device is bound. Device specific command sequences can be resolved by reading from a device profile cache 124 reducing the need to directly poll a device. The device profile cache 124 is typically a non-volatile memory or storage that stores command and response sequences for emulating a specific device type.

The filter 112 receives incoming commands (Command) including task management and session management directives from initiators, and filters the commands to pass commands to the first and second devices 118 and 120. The dynamic filter 100 operates to direct an incoming Command to first device 118 or second device 120 based on the actual state of a device. The filter 112 passes commands, Dev1_command and Dev2_command, to the first and second devices 118 and 120, respectively. Commands Dev1_command to the first device 118 are passed to the first device 118 via the device monitor 114. In various conditions, such as conflicting commands from multiple devices, the filter 112 filters the commands and sends commands Dev2_command to the second device 120. The filter 112 uses status information, Dev1_status and Dev2_status, from the devices and from the device state cache 122 to filter the commands. If first device 118 is bound, filter 112 passes commands from the bound initiator to the first device 118 and rejects or redirects commands from other initiators.

The device monitor 114 receives filtered physical commands Dev1_command from the filter 112, issues the commands Dev1_command to the first device 118 and captures output signals Dev1_output including status Dev1_status information from the first device 118. Device monitor 114 passes first device state information Dev1_state back to filter 112 and to device state cache 122 to maintain integrity of device state cache 122. Device monitor 114 intercepts sense, log data from the commands Command and maintains accuracy of device state cache 122 by extracting state information from the first device 118 data (Dev1_output) and passing the state information to device state cache 122. Device monitor 114 extracts state information from first device 118 status (Dev1_status) and passes the state information as a device state (PState) to device state cache 122 which feeds the first device state information Dev1_state back to the filter 112. Device monitor 114 also generates commands such as log sense to refresh device state cache 122 when appropriate, with device specific command sequences resolved using stored command sequences (CommandSeq) from the device profile cache 124.

The device state cache 122 receives information including device state PState and state information Dev1_output from the first device 118 to determine in real time whether the first device 118 is bound. The device state cache 122 supplies the result of the determination as a Bound signal to the filter 112 that uses the information to direct commands and management directives to the first device 118 and the second device 120.

The device profile cache 124 stores command sequences CommandSeq and response sequences RspSeq for emulating a device type. Command sequences CommandSeq pass to the device monitor 114. Response sequences RspSeq pass to the second device 120.

Figure 2:
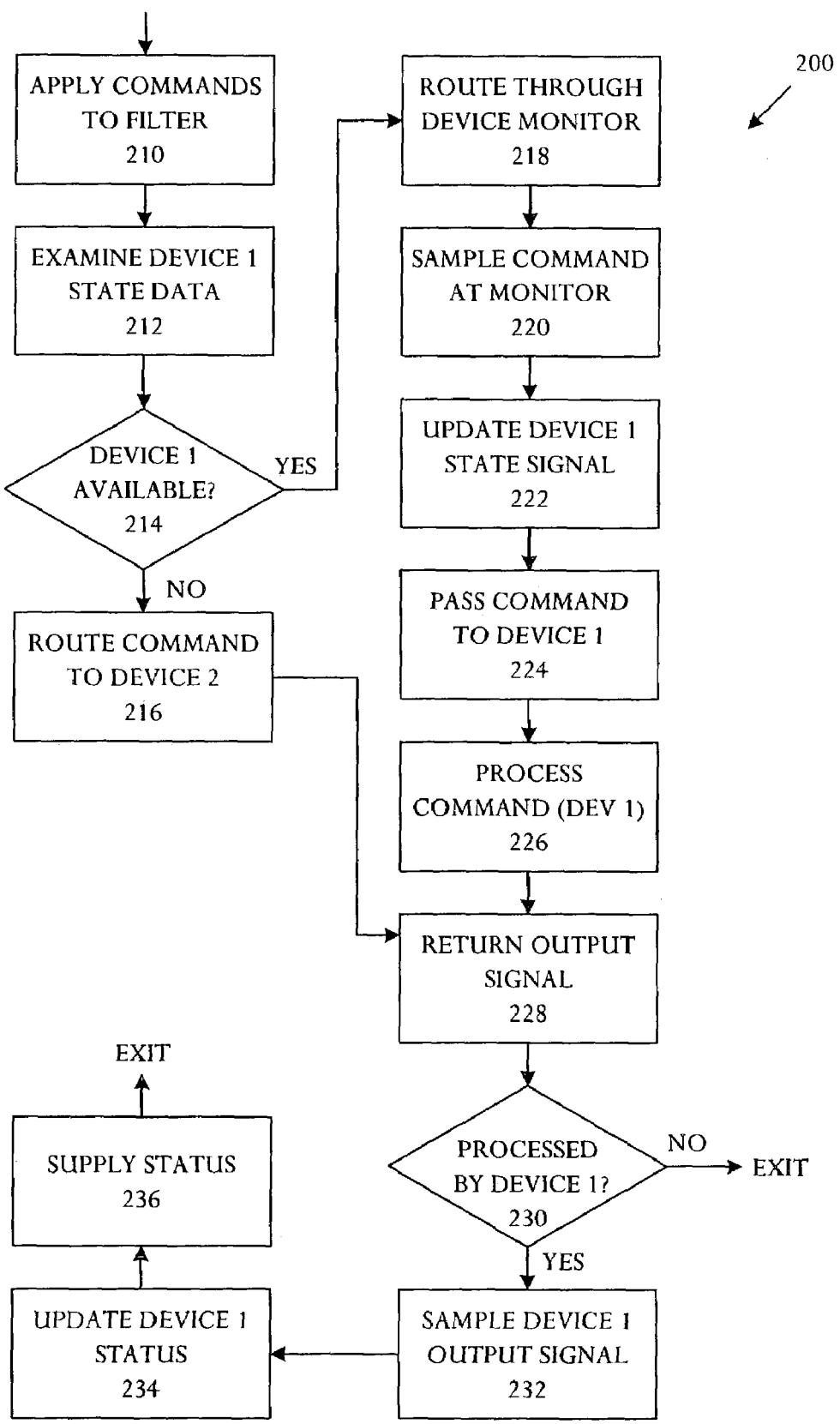
FIG. 2 is a flow chart depicts an example of a steady-state filtering operation.

Referring to FIG. 2 in combination with FIG. 1, a flow chart depicts an example of a steady-state filtering operation 200. The illustrative example presumes that first device 118 is a favored target and second device 120 is used when first device 118 is unavailable. Other embodiments may be implemented based on other assumptions.

In the steady state, commands can be repeatedly presented 210 to the input terminal of the filter 112. The filter 112 accesses and examines information 212 relating to the state of first device 118. If first device 118 is not available 214, the filter 112 routes the command 216 to second device 120. If first device 118 is available, the filter 112 routes the command 218 to the first device 118 via the device monitor 114.

The device monitor 114 samples the command 220, updates the first device state signal Dev1_state 222, and passes the command 224 to first device 118.

The device 118 or 120 processes the command 226 and returns an output signal Dev1_output or Dev2_output 228. If the device processing the command 230 is first device 118, the output signal Dev1_output is sampled 232 by the device monitor 114. The device monitor 114 updates the status information Dev1_status 234, and passes the signal 236 to other blocks in the dynamic filter 100.

Figure 3:
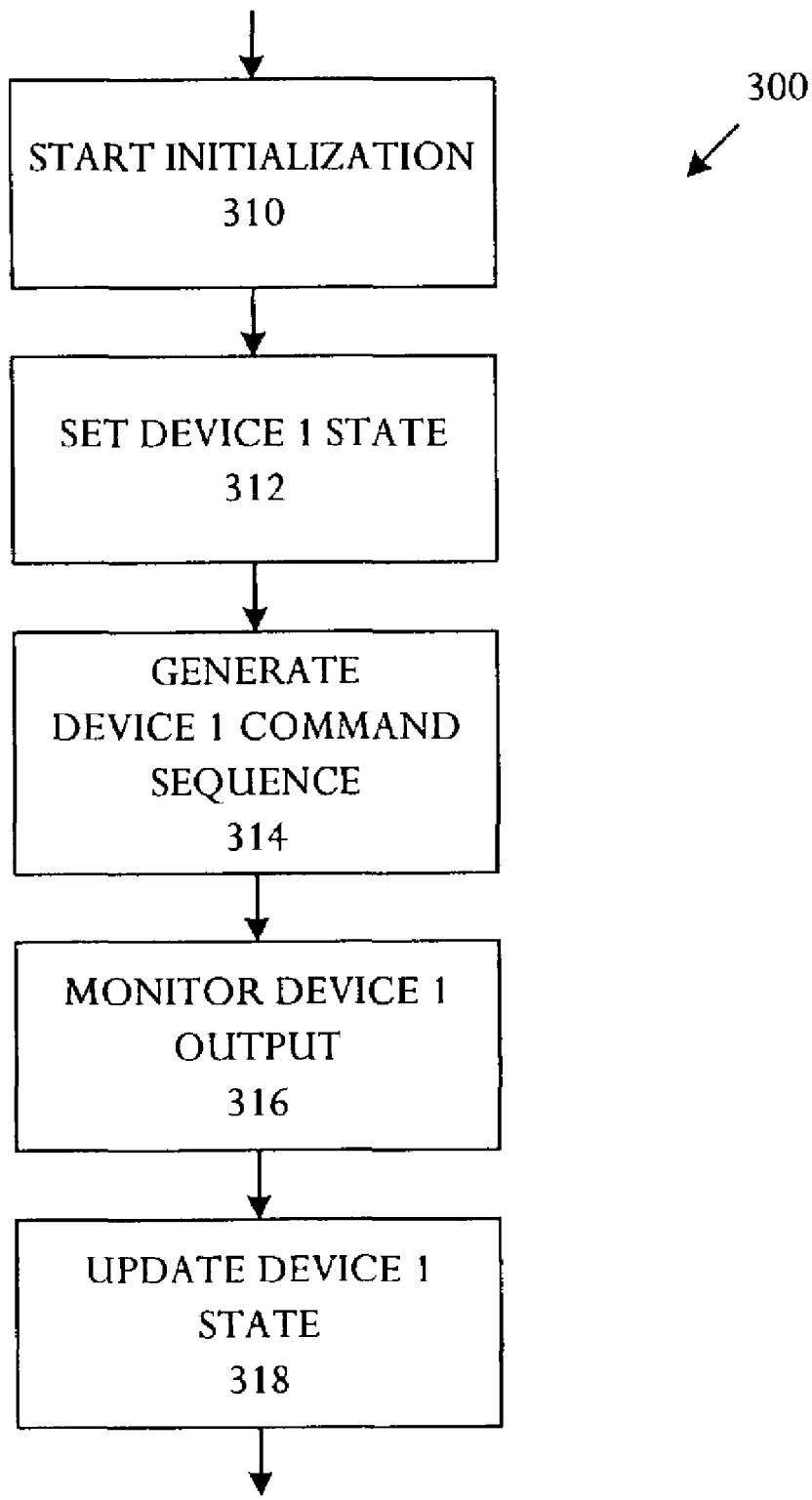
FIG. 3 is a flow chart that depicts an example of an initialization operation for the dynamic filter shown in FIG. 1.

Referring to FIG. 3 in combination with FIG. 1, a flow chart depicts an example of an initialization operation 300 for the dynamic filter 100. At system initialization 310 the device monitor 114 sets the state 312 of first device 118, either 'ready' or 'not ready' as is appropriate for a particular device and/or other conditions. For example, in some embodiments the device monitor 114 accesses information storage such as a nonvolatile memory to determine device state.

Before a command has been presented to the input terminal of the dynamic filter 100, the device monitor 114 generates a sequence of commands 314 to first device 118 to determine the device state. Output signals Dev1_output are accessed 316 by device monitor 114 but not passed on to other blocks in the system.

Based on results of the commands, the device monitor 114 updates the state Dev1_state 318 to reflect the actual state. The system is ready for steady-state operation 320.

The dynamic filter 100 can be implemented in various configurations such as hardware, software, firmware, and the like. Functional features may be implemented in a processor, microcontroller, central processing unit, state machine, programmable logic array, and other similar devices, unconstrained to a particular platform. The dynamic filter 100 is also suitable for embedded systems and in processor-based systems.

Figure 4:
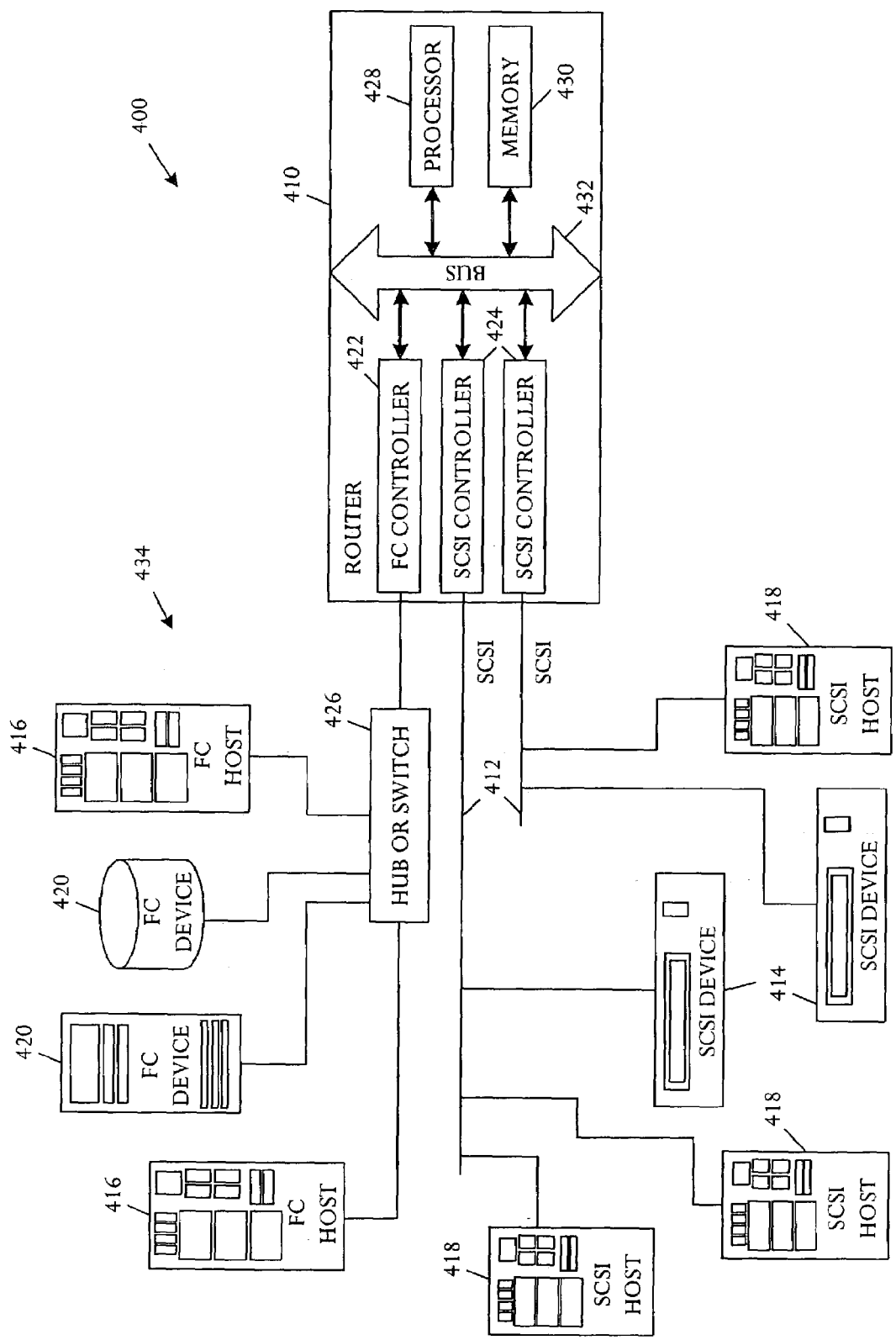
FIG. 4 is a schematic block diagram showing an example of a router for usage in a storage system such as a storage area network (SAN).

Referring to FIG. 4, a schematic block diagram shows an example of a router 410 for usage in a storage system 400 such as a storage area network (SAN). The router 410 enables bi-directional connectivity for narrow, wide fast, and ultra-2 Small Computer Systems Interface (SCSI) buses 412 in either a Fibre Channel Switched Fabric (FC-SW) or a Fibre Channel Arbitrated Loop (FC-AL) environment. The router 410 can translate Fibre Channel Protocol (FCP) to and from SCSI protocol, and transfers commands, data, and status information to and from Fibre Channel hosts 416 and devices 420 and SCSI hosts 418 and devices 414. The router 410 supports Fibre Channel hosts 416 and SCSI hosts 418 as initiator devices. The router 410 also supports Fibre Channel devices 420 including direct access devices such as Random Array of Inexpensive Disk (RAID) controllers, disk drives, Just a Bunch of Disks (JBOD), and the like. SCSI devices 414 include sequential access devices such as tape drives, tape libraries. Various SCSI devices 414 and Fibre Channel devices 420 include tape and magneto-optical libraries. Fibre Channel hosts 416 and devices 420 communicate to the router 410 via a hub or switch 426.

In other embodiments, for example future implementations, the illustrative system can be used in fibre-to-fibre routers, and Internet SCSI (iSCSI)-to-SCSI applications. Accordingly, the illustrative system and techniques can be used according to standards other than the illustrative fibre channel-to-SCSI implementation.

The router 410 typically has multiple controllers including one or more Fibre Channel Controllers 422 and one or more SCSI Controllers 424 for communicating via Fibre Channel and SCSI buses 412, respectively. The router 410 can further comprise a processor 428 that controls operations of the router 410 and a memory 430, for example a volatile memory and a nonvolatile memory. The processor 428 controls operations of the Fibre Channel and SCSI controllers 422 and 424 via communications on an internal bus 432.

The router 410 converts Fibre Channel host protocol to SCSI device protocol in response to encapsulated FCP protocol command packets issued from a Fibre Channel hosts 416 to the router 410. The router Fibre Channel Controller 422 interprets the Fibre Channel information and places the packet in a buffer memory 430. The processor 428 interprets the Fibre Channel information packet and programs the router SCSI Controller 424 to process the transaction. The router SCSI Controller 424 sends the command to the target SCSI device 414 and the SCSI device 414 interprets and executes the command.

In a SCSI-to-Fibre Channel protocol process, the initiator is a SCSI host 418 on the SCSI bus 412 that issues commands so that the information is passed through the router 410 to a target on the Fibre Channel Storage Area Network (FC-SAN) 434. The SCSI host 418 issues a command to the router 410. The router SCSI Controller 424 interprets the command and places the interpreted command in the buffer memory 430. The processor 428 interprets the data and programs the router Fibre Channel Controller 422 to process the transaction. The router Fibre Channel Controller 422 translates the data into an FC protocol packet and sends the packet to the target Fibre Channel device 420. The target Fibre Channel device 420 interprets the FC protocol packet and executes the command.

Figure 5:
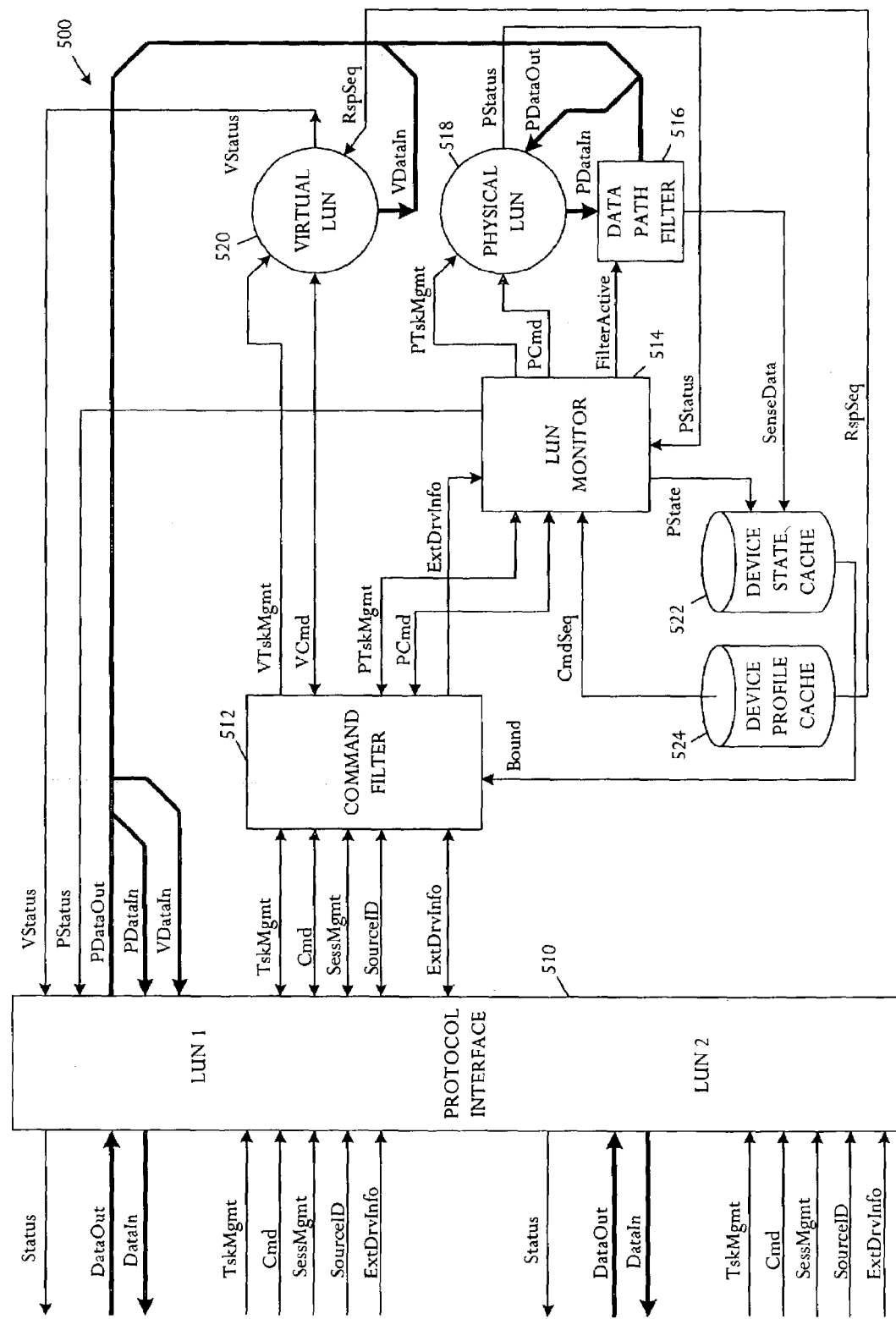
FIG. 5 is a schematic block diagram that illustrates an embodiment of a storage system comprising router elements.

Referring to FIG. 5, a schematic block diagram illustrates a LUN virtualization system 500. The LUN virtualization system 500 can, for example, be implemented in a router. In other embodiments, the LUN virtualization system 500 can be implemented in other devices, components, or systems such as switches, hubs, storage devices, storage libraries, servers, hosts, and the like. In some embodiments, the illustrative LUN virtualization system 500 can be implemented as firmware components that are capable of executing on a processor or controller in a router or other device. The block diagram for a LUN virtualization system 500 shows components and data flows for a single LUN. The data path is shown in bold lines. LUN virtualization system 500 can be duplicated for each LUN supported by the router or other device.

One embodiment of the LUN virtualization system 500 comprises a protocol interface 510, a command filter 512, a LUN monitor 514, a data filter 516, a physical LUN 518, a virtual LUN 520, a device state cache 522, and a device profile cache 524.

The protocol interface 510 performs virtual/physical mapping to facilitate virtualization of storage LUNs. The protocol interface 510 receives commands and configures information blocks for transmission, for example by matching status to the correct command, and supplying header information for status frames. The protocol interface 510 also handles initiator protocol, for example by obtaining unit attention of the first access of an initiator. The protocol interface 510 can manage signals from multiple LUNs. The protocol interface 510 serves as a common interface point for external communications.

In one specific example, the protocol interface 510 can perform Fibre Channel-to-Small Systems Computer Interface (SCSI) conversion, receiving command packets from a host, stripping header and extraneous information, and passing a SCSI command. For returning information, the protocol interface 510 saves at least some of the stripped information and repackages the return information into suitable form for sending back to the host.

The command filter 512 receives commands and task management directives, and determines how and when a physical device acts on the commands and directives. The command filter 512 also determines whether commands are directed to a virtual LUN or the physical LUN. If a device is bound, commands from the binding initiator are passed through to the physical LUN and commands from other initiators are either rejected or handled by the virtual LUN, depending on the command, conditions, and circumstances. In a specific illustrative example, the command filter 512 handles SCSI commands such as ABORT, RESET, TARGET RESET, ABORT TASK, ABORT COMMAND SET, and others.

The illustrative command filter 512 is a dynamic filter that filters information based on the state of a monitored device and can constantly update filter parameters as the state changes. The command filter 512 quickly and efficiently filters commands and task management directives to direct the commands and task management directives selectively to a LUN, for example to either the physical LUN 518 or the virtual LUN 520. The system constantly analyzes multiple conditions in a background process that extracts a single parameter, device state, from the conditions and the single parameter is the basis for filtering decisions. In the illustrative embodiment, the LUN monitor 514 executes the background process.

The command filter 512 also performs initialization for LUN virtualization. On system powerup and possibly other conditions, the system begins with no known state, no starting information. The initialization procedure collects information for storage in the device state cache 522 to enable LUN virtualization. In one embodiment, the command filter 512 calls for initialization and the LUN monitor 514 accesses storage elements in the device state cache 522 and determines that no state is defined. The LUN monitor 514 accesses the device profile cache 524 to fill storage elements in the device state cache 522.

The LUN monitor 514 issues commands to the physical LUN and captures status and some data from the physical LUN. The LUN monitor 514 maintains and ensures integrity of the device state cache. The LUN monitor 514 intercepts sense and log data from incoming commands to maintain accuracy of the device state cache, thereby maintaining the data structure containing the device state. The LUN monitor 514 also generates sense and log commands, if appropriate, to refresh the device state cache 522. Device specific command sequences can be resolved by using the device profile cache 524.

The LUN monitor 514 can intelligently monitor command and task management directive traffic to continuously update device state. The LUN monitor 514 intercepts state information that becomes available as the physical LUN 518 performs commands requested by a host or initiator, and updates the device state cache 522 based on the intercepted state information. Accordingly, the LUN monitor 514 can update state passively without issuing commands to the LUN and thereby increasing extraneous traffic. The physical LUN 518 produces status information PStatus as a result of performance of a command. The LUN monitor 514 can access PStatus and determine whether the information is useful for tracking and, if so, store or update information in device state cache 522. By updating information by passively tracking PStatus from externally-requested commands rather than actively requesting commands, the LUN monitor 514 can refresh the device state cache 522 without increasing command traffic to the physical LUN 518.

The LUN monitor 514 generally functions on the basis that a set of information is desired to describe conditions and operations of a device or LUN. Much of the information can be captured by passively monitoring traffic between an initiator and the LUN, including command, task management, data, and status traffic. The LUN monitor 514 can refresh information that is not captured within a suitable interval by issuing supplemental commands to the physical LUN. In the illustrative embodiment, the device state cache 522 stores desired information and the device profile cache 524 defines the information to store.

The LUN monitor 514 accesses information from the device profile cache 524 that identifies information to maintain in the device state cache 522. LUN monitor 514 tracks updating of the information and determines when information is to be refreshed, either because the information is unavailable or dated. When refresh is due, LUN monitor 514 can directly request information by issuing commands to the physical LUN 518. Device profile cache 524 contains various management information including identification of information that need not be updated once set, refresh rates for particular information, and the like. Some information may evolve at different rates. LUN monitor 514 can adapt refresh rates according to dynamically changing aspects of LUN operation.

The data filter 516 filters the data path for sense and log data. The data filter 516 enables access to data to monitor control information. For example, LOG PAGE and MODE PAGE information may be useful to track state. The data filter 516 enables filtering of the data path to access control information, for example copying information from the data path, while introducing only a small time delay. The data filter 516 becomes inactive, or transparent, when filtering is not desired. Data filter 516 can thus be implemented for low impact to the data path, thereby reducing delay in data passing through the filter. Most control information is obtained from status, PStatus, and not from the data path, so that the data filter 516 can often be inactive. When active, the data filter 516 passes through information with no change to the passing information, precisely maintaining data integrity.

While physical LUN 518 is the driver for the physical drive or physical LUN, virtual LUN 520 is an emulator for the physical LUN and resolves device specific response sequences using the device profile cache 524. The virtual LUN 520 can emulate one or more behaviors of the physical LUN 518 and can respond to command directives. Examples of command directives include LOG SENSE, MODE SENSE, RECEIVED DIAGNOSTICS, INQUIRY, and others. The virtual LUN 520 is configured in the image of the physical LUN 518. In some embodiments, the amount of storage for the virtual LUN 520 can be limited so that the virtual LUN cannot receive large data quantities. In such embodiments, the virtual LUN 520 can source data because the supplied data is generally small, for example information stored in the device state cache 522 such as log pages and maintenance information. Embodiments with a large storage capacity can have greater capability to generate and receive data.

The device state cache 522 is a volatile memory or storage that stores information for making a real-time determination of whether a physical LUN is bound. In some embodiments, drive firmware modules hosted by the router can manage the device state cache 522.

The device profile cache 524 is typically a non-volatile memory or storage that stores command and response sequences for emulating a specific drive type. In some embodiments, drive firmware modules hosted by the router can implement the device profile cache 524.

The protocol interface 510 handles multiple signals in operation as a common interface for external communications. The protocol interface 510 receives task management information (TskMgmt) as incoming task management directives from various devices, illustratively a first LUN and a second LUN. Task management directives include TARGET RESET, Automatic Contingent Allegiance (ACA) task attribute, and ABORT TASK. The protocol interface 510 passes task management directives to the command filter 512 and may also receive task management directives in return from the command filter 512. Protocol interface 510 also receives incoming commands (Cmd) from the LUNs and passes the commands through to the command filter 512. The protocol interface 510 receives incoming session management (SessMgmt) directives from the LUNs, for example including LOGIN and LOGOUT directives. The protocol interface 510 passes the session management directives to the command filter 512 and also receives return session management directives from the command filter 512. Protocol interface 510 receives source identifier (SourceID) information from the LUNs and passes the information to the command filter 512. Other information from the LUNs to the protocol interface 510 includes extra drive information (ExtDrvInfo), information about drive state from external sources. For example, some libraries issue LOAD UNLOAD commands over the Automation Control Interface (ACI) port. Protocol interface 510 passes ExtDrvInfo to the command filter 512.

The protocol interface 510 is an interface to the data path including Data input (DataIn) lines to an initiator and data output (DataOut) lines from the initiator. DataIn are resolved by the protocol interface 510 from PDataIn, data read from the physical LUN, or VDataIn, data read from the virtual LUN. DataOut are resolved by the protocol interface 510 from Status information that is returned from either physical LUN 518 or virtual LUN 520. Status returns to the initiator via the protocol interface 510 from either the virtual LUN 520 or the physical LUN 518. The protocol interface 510 resolves Status from either VStatus or PStatus.

The command filter 512 operates upon the incoming commands Cmd, task management directives (TskMgmt), and session management directives (SessMgmt) from the initiators and filters the commands and directives to pass commands to the physical LUN 518 and the virtual LUN 520. The command filter 512 passes physical commands (PCmd) and physical task management commands (PTskMgmt) to the physical LUN 518. Command filter 512 determines task management handling by filtering physical task management commands (PTskMgmt) for the physical LUN 518. Command filter 512 directs commands to either physical LUN 518 or virtual LUN 520. In various conditions, such as conflicting commands from multiple LUNs, the command filter 512 filters the commands and sends virtual commands (VCmd) to the virtual LUN 520, and virtual task management commands (VTskMgmt) to the virtual LUN 520. The command filter 512 passes through external drive information (ExtDrvInfo) from the protocol interface 510 to the LUN monitor 514.

The command filter 512 uses information from the LUNs and from the device state cache 522 to filter the commands and directives. A Bound signal from the device state cache 522 contains state information deduced from contents of the device state cache 522. If physical LUN 518 is bound, command filter 512 passes commands from the bound initiator to the physical LUN 518 and rejects or redirects commands from other initators.

The LUN monitor 514 receives filtered physical commands PCmd and physical task management commands PTskMgmt from the command filter 512 and issues the commands to the physical LUN 518 and captures physical status PStatus and some physical data PDataIn from physical LUN 518. LUN monitor 514 passes physical status PStatus back to protocol interface 510 and to device state cache 522 to maintain integrity of device state cache 522. LUN monitor 514 intercepts sense, log data from the commands PCmd and PTskMgmt, passing a filter active (FilterActive) signal to the data filter 516 to activate and deactivate the filter. LUN monitor 514 management of data filter 516 maintains accuracy of device state cache 522. LUN monitor 514 and data filter 516 extract state information from the physical LUN 518 data (PDataIn) and pass the state information in a sense data (SensData) to device state cache 522. LUN monitor 514 extracts state information from physical LUN 518 status (PStatus) and passes the state information as physical device state (PState) to device state cache 522. LUN monitor 514 also generates sense, log commands to refresh device state cache 522 when appropriate with device specific command sequences resolved using stored command sequences (CmdSeq) from the device profile cache 524.

The data filter 516 receives physical data PDataIn from the physical LUN 518 and, under control of FilterActive from LUN monitor 514 filters the PDataIn and passes the filtered data as physical data out from the initiator (PDataOut) to the protocol interface 510.

Physical LUN 518 is a physical storage drive, typically a tape drive but can be other types of drives such as disk drives, compact disk read-only-memory (CD ROM) drives and the like. Under direction of physical commands PCmd and physical task management directives PTskMgmt from the LUN monitor 514, the physical LUN 518 transfers data to and from an initiator. Physical data in to the initiator, PDataIn, is data accessed from physical LUN 518. Physical data out from the initiator, PDataOut, is data written to the physical LUN 518. Physical data PDataIn sent to an initiator can be filtered in the data path filter 516 to extract state information indicative of whether the physical LUN 518 is bound to an initiator. Physical device status information from the physical LUN 518 is accessed by the LUN monitor 514 and passed through the protocol interface 510 to an initiator.

Virtual LUN 520 is a virtual storage device that emulates various aspects of the physical LUN 518. In various embodiments, different aspects of a physical device may be emulated. For example, in some embodiments, the virtual LUN 520 can emulate task management and/or other control aspects of operation. In other embodiments, virtual LUN 520 can include sufficient storage capacity to emulate data path aspects of operation. Under direction of virtual commands VCmd and virtual task management commands VTskMgmt from the command filter 512, virtual LUN 520 transfers information to and from an initiator. Physical data out PDataOut from an initiator can be written to the virtual LUN 520. Virtual data in VDataIn to an initiator is data that can be read from the virtual LUN 520. Device specific response sequences RspSeq are resolved by the device profile cache 524. Virtual status, VStatus, the status from the virtual LUN 520 passes to the protocol interface 510 for resolution and to an initiator.

Status is returned to the initiator from either physical LUN 518 or virtual LUN 520 and is resolved by the protocol interface 510 from either virtual status, VStatus, or physical status, PStatus.

The device state cache 522 receives information including physical device state PState and state information SenseData from the physical LUNs 518 to determine whether the physical LUN 518 is bound in real time. The device state cache 522 supplies the result of the determination as a Bound signal to the command filter 512 that uses the information to direct commands and management directives to the physical LUN 518 and the virtual LUN 520.

The device profile cache 524 stores command sequences CmdSeq and response sequences RspSeq for emulating a device type. Command sequences CmdSeq pass to the LUN monitor 514. Response sequences RspSeq pass to the virtual LUN 520.

Virtualization can be enabled and disabled, for example via task management directives TskMgmt that operate on the command filter 512 and LUN monitor 514 to pass all commands to the physical LUN 518. The virtualization feature is manageable on the basis that the feature can be enabled or disabled, as desired, for various reasons such as diagnostic analysis and testing, and capability to separately license the feature. In various implementations, the virtualization feature facilitates manageability by confining activation and deactivation in time to a single discrete interaction rather than a sequence of interactions. The system can avoid unstable or incorrect states using various techniques, such as initializing upon feature activation and sending status for all active LUNs upon feature deactivation.

Although the illustrative example describes a particular storage device and system, the techniques may be used for various other systems. Generally, the techniques can be applied to any system in which multiple hosts, servers, or initiators can attempt to access the same device concurrently, wherein the device can address one request at a time.

What is claimed:

1. A filter comprising:
a first device;
a second device;
a dynamic filter coupled to the first device and the second device, the dynamic filter selectively directing commands to the first device and to the second device based on dynamic status of the first device; and
a device monitor coupled to the dynamic filter and to tube first device and adapted to monitor traffic to the first device, detect whether the monitored traffic is insufficient for determining the first device dynamic status, issue supplemental commands to the first device when the monitored traffic is insufficient, and determine the first device dynamic status using the supplemental commands.

2. The filter according to claim 1 further comprising:
the device monitor adapted to analyze multiple conditions in a background process that extracts a device state parameter from the multiple conditions, the device state parameter for directing the dynamic filter.

3. The filter according to claim 1 wherein:
the dynamic filter selectively directs commands based on passively monitored traffic to the first device including command, task management, data, and status traffic.

4. The filter according to claim 1 wherein:
the dynamic filter selectively directs commands based on actively issued supplemental commands to the first device that refresh device information.

5. The filter according to claim 1 wherein:
the dynamic filter selectively directs commands based on intercepted incoming and/or outgoing traffic from the first device used to determine first device state.

6. The filter according to claim 1 further comprising:
the dynamic filler selectively directs commands based on intercepted incoming and/or outgoing traffic from the first device used for making a real-time determination of whether the first device is bound to a requesting device.

7. The filter according to claim 1 further comprising:
a data path coupling the first device and the second device to a plurality of servers.

8. The filter according to claim 1 further comprising:
the dynamic filter adapted to protect state of the first device during successive data transfer and media movement operations.

9. The filter according to claim 1 wherein:
the second device is adapted to emulate responses of the first device; and
the device monitor is adapted to redirect access from the second device to the first device when the first device becomes available.

10. A method of filtering commands comprising:
receiving a command directed to a first device;
dynamically determining state of the first device;
selectively directing the command to the first device or to a second device based on the determined first device state;
monitoring traffic to the first device;
determining a condition of monitored traffic that is insufficient for determining first device state; and
issuing supplemental commands to the first device to refresh device information for the condition of insufficient monitored traffic.

11. The method of claim 10 further comprising:
presuming the first device is a preferred target device and the second device is used if the first device is unavailable.

12. The method of claim 10 further comprising:
filtering commands in a steady state comprising:
examining state of the first device;
if the first device is not available, routing the command to the second device;
if the first device is available, routing the command to the first device.

13. The method of claim 10 further comprising:
filtering commands in a steady state comprising:
sampling a command routed to the first device; and
passing the command to the first device.

14. The method of claim 10 further comprising:
filtering commands in a steady state comprising:
processing a command;
returning an output result in response to the command;
if the first device processes the command:
sampling the output result;
updating a first device status output signal; and
supplying the first device status output signal.

15. The method of claim 10 further comprising:
filtering commands in an initial state comprising:
setting a first device state;
generating a sequence of commands to the first device to determine a first device state; and
retaining the first device state without passage to other system components.

16. The method of claim 10 further comprising:
setting the first device state to 'ready' or 'not ready' based on the particular application.

17. The method of claim 10 further comprising:
filtering commands in the initial state comprising:
generating a result of a command performed by the first device:
updating the first device state based on the generated result to reflect actual first device state.

18. A method of filtering commands comprising:
receiving a command directed to a first device;
dynamically determining state of the first device;
selectively directing command to the first device or to a second device based on the determined first device state;
passively monitoring traffic to the first device including command, task management, data, and status traffic;
determining when the passively monitored traffic is insufficient for determining first device state; and
actively issuing supplemental commands to the first device to refresh device information if monitored traffic is insufficient.

19. A filter comprising:
means for receiving a command directed to a first device;
means for dynamically determining state of the first device; and means for selectively directing the command to the first device or to a second device based on the determined first device state;

means for monitoring traffic to the first device;

means for determining a condition of monitored traffic that is insufficient for determining first device state; and means for issuing supplemental commands to the first device to refresh device information for the condition of insufficient monitored traffic.

20. An article of manufacture comprising:

a computer usable medium having computer readable program code means embodied therein for causing a processor to receive a command directed to a first device;

a computer readable program code means for causing the processor to dynamically determine state of the first device; and a computer readable program code means for causing the processor to selectively direct the command to the first device or to a second device based on the determined first device state;

a computer readable program code means for causing the processor to motor traffic to the first device;

a computer readable program code means for causing the processor to detect whether the monitored traffics insufficient for determining first device state; and a computer readable program code means for causing the processor to issue a supplemental command to the first device to refresh device information if monitored traffic is insufficient.

21. The article of manufacture according to claim 20 further comprising:

a computer readable program code means for causing the processor to presume the first device is a preferred target device and the second device is used if the first device is unavailable.

22. An article of manufacture comprising:

a computer usable medium having computer readable program code means embodied therein for causing a processor to receive a command directed to a first device;

a computer readable program code means for causing the processor to dynamically determine state of the first device;

a computer readable program code means for causing the processor to selectively direct the command to the first device or to a second device based on the determined first device state;

a computer readable program code means for causing the processor to passively monitor traffic to the first device including command, task management, data, and status traffic;

a computer readable program code means for causing the processor to determine when the passively monitored traffic is insufficient for determining first device state; and a computer readable program code means for causing the processor to actively issue supplemental commands to the first device to refresh device information if monitored traffic is insufficient.

* * * * *

UNITED STATES PATENT AND TRADEMARK OFFICE
CERTIFICATE OF CORRECTION

PATENT NO. : 7,349,997 B2  Page 1 of 1
APPLICATION NO. : 10/346002
DATED : March 25, 2008
INVENTOR(S) : Stanley Smith Feather, Jr. et al.

It is certified that error appears in the above-identified patent and that said Letters Patent is hereby corrected as shown below:

In column 11, line 20, in Claim 1, delete "tube" and insert -- the --, therefor.

In column 11, line 46, in Claim 6, delete "filler" and insert -- filter --, therefor.

In column 12, line 47, in Claim 17, after "device" delete ":" and insert -- ; --, therefor.

In column 12, line 54, in Claim 18, after "directing" insert -- the --.

In column 13, line 23, in Claim 20, delete "motor" and insert -- monitor --, therefor.

In column 13, line 25, in Claim 20, delete "traffics" and insert -- traffic is --, therefor.

Signed and Sealed this

Twenty-second Day of July, 2008

JON W. DUDAS
*Director of the United States Patent and Trademark Office*